US007937416B2

(12) United States Patent
Hossfeld et al.

(10) Patent No.: US 7,937,416 B2
(45) Date of Patent: *May 3, 2011

(54) BUSINESS INTELLIGENCE DATA REPOSITORY AND DATA MANAGEMENT SYSTEM AND METHOD

(75) Inventors: Cassandra Hossfeld, Littleton, CO (US); Allen Rodgers, Evergreen, CO (US); Matthew Schnittman, Highland Ranch, CO (US); Marc Holliday, Dublin, OH (US)

(73) Assignee: Ecollege.com, Denver, CO (US)

( * ) Notice: Subject to any disclaimer, the term of this patent is extended or adjusted under 35 U.S.C. 154(b) by 467 days.

This patent is subject to a terminal disclaimer.

(21) Appl. No.: 12/189,025

(22) Filed: Aug. 8, 2008

(65) Prior Publication Data

US 2009/0083311 A1 Mar. 26, 2009

Related U.S. Application Data

(63) Continuation of application No. 11/323,435, filed on Dec. 30, 2005, now Pat. No. 7,512,627.

(51) Int. Cl.
*G06F 17/30* (2006.01)

(52) U.S. Cl. ....................................................... 707/803

(58) Field of Classification Search .................. 707/603, 707/688, 791, 802, 803, 804, 807
See application file for complete search history.

(56) References Cited

U.S. PATENT DOCUMENTS

| | | | |
|---|---|---|---|
| 6,149,441 | A | 11/2000 | Pellegrino et al. |
| 6,741,967 | B1 | 5/2004 | Wu et al. |
| 6,915,286 | B2 | 7/2005 | Policastro et al. |
| 2003/0073065 | A1 | 4/2003 | Riggs |
| 2004/0110119 | A1 | 6/2004 | Riconda et al. |
| 2006/0149699 | A1 | 7/2006 | Wolfston et al. |

*Primary Examiner* — Cam-Linh Nguyen
(74) *Attorney, Agent, or Firm* — Snell & Wilmer L.L.P.

(57) ABSTRACT

A business intelligence and data management system is disclosed comprising a database for storing multi-dimensional business data from multiple online educational institutions; a usage tracking engine for recording within a user profile the time and duration of access to disparate system features. A reporting engine provides periodic and custom reports and a benchmarking engine facilitates comparison of internal institution data with aggregate data from multiple institutions, to compare student retention, course completion, student satisfaction, and student performance. The reporting engine provides reports on course retention rates, course evaluations, faculty evaluations, enrollment, student performance, and course run rates. The usage tracking engine, benchmarking engine, and reporting engine facilitate determination of best practices to improve student enrollment, student retention, course completion, student performance, and student satisfaction. A custom query engine facilitates freeform searches of business data and a data mining engine provides access to detailed data supporting the periodic reports.

19 Claims, 4 Drawing Sheets

BUSINESS INTELLIGENCE DATA REPOSITORY AND DATA MANAGEMENT SYSTEM AND METHOD

CROSS-REFERENCE TO RELATED APPLICATIONS

This application is a continuation of and claims priority to U.S. patent application Ser. No. 11/323,435 entitled "BUSINESS INTELLIGENCE DATA REPOSITORY AND DATA MANAGEMENT SYSTEM AND METHOD," filed on Dec. 30, 2005, which is included herein by reference in its entirety.

FIELD OF INVENTION

The invention generally relates to an on-line educational business data repository and management system and method.

BACKGROUND OF THE INVENTION

As the number of online educational institutions, courses, and enrolled students increases, institutions are generating vast amounts of business data. A variety of individual software applications collect and generate data during student registration, student enrollment, interaction within a course, student recruiting, and the like. However, as the volume of data grows, it becomes increasingly difficult to correlate and analyze diverse data sets. Moreover, existing applications typically afford users limited reporting capabilities, often only within a single application. For example, existing systems typically only report upon the number of hits or access attempts to a feature. Furthermore, many applications have reduced data retention periods, often limiting data reporting and analysis to the present or previous term.

Thus, many data correlations remain unconnected and unrevealed due to the lack of a comprehensive business intelligence data management and reporting system. Accordingly, a need exists for a system and method to better leverage business data to allow informed decisions by institution administrators, improved retention of students, improved understanding of the online student lifecycle, improved curricula, improved financial aid and other student services, and improved capabilities for compliance with accreditation requirements.

SUMMARY OF THE INVENTION

The invention provides a data management system comprising a database for storage of multi-dimensional business data sets from multiple educational institutions; a usage tracking engine for tracking features or tools accessed by a user including a time and duration of access to the feature to facilitate comparison of student usage profiles, instructor usage profiles, and course tool usage profiles; a reporting engine configured to provide periodic reports; and a benchmarking engine configured to facilitate comparison of internal data associated with a first institution to aggregate data from multiple institutions.

The invention facilitates management of diverse business data generated and collected by on-line educational institutions through a multi-dimensional data repository. The invention also includes associated reporting and analytic tools. A business intelligence system includes a reporting engine, usage tracking engine, and benchmarking engine to inform and support business decisions based on data collected from a plurality of applications. The reporting engine provides predefined reports and a custom query engine provides free-form searching capabilities. The invention provides online educational institutions the capability to quickly and efficiently analyze internal data through business intelligence tools and data mining capabilities.

The invention provides flexible data analysis tools for building predictive models and performing multi-dimensional analysis to understand program performance, student retention, learning outcomes and, in turn, to improve overall institutional performance. For example, various embodiments provide tools for identifying key drivers to student course completion, including "successful" student and instructor user tracking profiles. Similarly, reports may correlate instructor participation with student participation or course usage profiles for multiple users. Institutions may compare data from a selected program level with comparable data sets within the institution or may compare internal data sets with aggregate external data from multiple other institutions. For example, administrators may compare course retention rates by campus, instructor, course, and/or term.

The invention provides current or real-time as well as historic reporting capabilities, facilitating identification of "key metric" behaviors and events enabling institutions to develop best practices. For example, by analyzing the relationship between successful learning outcomes and the time spent in a course by a student and instructor, administrators may establish best practices for student and instructor interaction to increase student retention, course completion, and overall program performance.

BRIEF DESCRIPTION OF THE DRAWINGS

Additional embodiments of the invention will become evident upon reviewing the non-limiting embodiments described in the specification and the claims taken in conjunction with the accompanying figures, wherein like reference numerals denote like elements.

DETAILED DESCRIPTION

Figure 1:
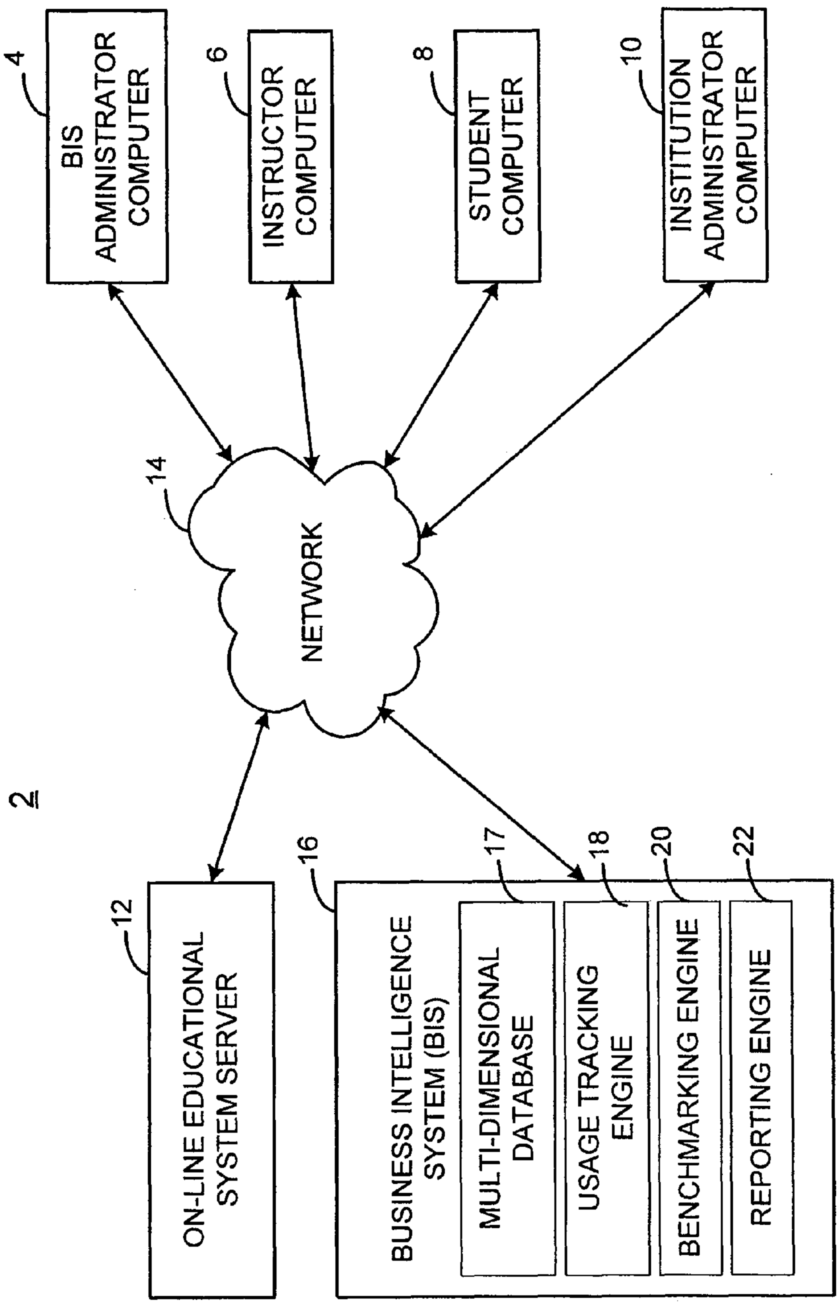
FIG. 1 is a diagram illustrating an exemplary network configuration for a business intelligence system in accordance with an exemplary embodiment of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, other embodiments may be realized and logical and other changes may be made without departing from the spirit and scope of the invention. Thus, the detailed description herein is presented for purposes of illustration only and not of limitation. For the sake of brevity, conventional data networking, application development and other functional embodiments of the systems (and components of the individual operating components of the systems) may not be described in extensive detail herein.

The present invention comprises a business intelligence system including a data repository and various reporting and analytical tools configured to facilitate generation of reports (e.g., predefined reports) and queries (e.g., custom queries). These analytical tools provide institutions the capability to efficiently leverage diverse business data to inform and support business decisions, for example, to establish best practices for instructors and students. Standard and custom reporting enables institutions to identify trends, critical success factors, and problem areas across their online programs and to make strategic decisions about program growth, faculty effectiveness, student retention, and/or program success. Additionally, various embodiments provide institutions access to data (e.g., anonymous aggregate data) across multiple institutions for benchmark comparison of various metrics or data sets. The aggregate data may thus be used to create industry benchmarking standards and to allow institutions to compare themselves to similar institutions or to the industry as a whole.

As used herein, "business data" and "data" include internal institution data, usage tracking data, and aggregate institution data. For example, business data includes any data related to student enrollment, registration, student retention, student-instructor interaction, student or instructor system feature usage, student performance, student satisfaction, course evaluations, and/or the like. Internal data includes tracking data such as user profiles for students, instructors, and administrators. As used herein, the term "institution" refers to an educational organization or any subdivision, department, subgroup, or grouping of the same. As used herein, the terms "user," "administrator," "instructor," "institution," "participant," "publisher," or "campus" may be used interchangeably with each other, and include any suitable person, entity, machine, hardware, software and/or business. Varying levels of access may be granted users based on various user role types and user rights. Individual users or user types may receive various rights to data, such as, for example, rights to author, edit, approve, publish, delete, view, copy, manage, audit, report and the like. As used herein, the terms "system," "engine," "tool," "feature," "server", "computer," "network," "application," or the like may be used interchangeably with each other, and each shall mean any software and/or hardware suitably configured to perform the respective functions discussed herein. Moreover, any reference to singular includes plural embodiments, and any reference to more than one component may include a singular embodiment.

Turning now to the drawings, FIG. 1 is a diagram illustrating an exemplary network configuration 2 for an exemplary business intelligence system within the context of an on-line educational platform. Network configuration 2 includes, in one embodiment, an on-line educational system server 12 and a business intelligence system ("BIS") 16. BIS 16 is in communication with a BIS system administrator computer 4, instructor computer 6, student computer 8 and an institution administrator computer 10 via a network 14, such as the Internet. On-line educational system server 12 stores data on BIS 16 for use by administrators at computers 4 and 10. Instructors at instructor computer 6 and students at student computer 8 may interact with each other and with on-line educational system server 12 via network 14. Examples of on-line educational system server 12 and of a system for delivering courses on-line are described in U.S. Pat. No. 6,470,171, which is hereby incorporated by reference. BIS 16 or system server 12 may further communicate with any number of networked resources.

BIS 16 includes a multi-dimensional database 17, usage tracking engine 18, a benchmarking engine 20, and a reporting engine 22, which engines may be embodied as software modules, software applications, hardware, or combinations of the same. In one embodiment, engines 18, 20, and 22 are software application hosted by BIS 16. Alternatively, engines 18, 20, and 22 may be remotely hosted and suitably associated with or accessible by BIS 16. Usage tracking engine 18 is configured to monitor activity of a user at computers 4, 6, 8, or 10, and to generate user tracking data, such as the time and duration of access relative to selected system or application features. Tracking data is arranged into usage profiles, such as student and instructor profiles, or feature-specific usage profiles. Archived or historic usage profiles may be aggregated for use by benchmarking engine 20 or reporting engine 22. Benchmarking engine 20 is configured to aggregate data from multiple institutions according to various metrics for use in comparison of internal data from an institution to anonymous, aggregate data from other institutions. Reporting engine 22 is configured to provide periodic and/or custom reports based on internal or aggregate institution data according to selected metrics. Various alternative embodiments include a custom query engine configured to facilitate freeform searches of business data accessible through BIS 16, and/or a data mining engine providing access to detailed data supporting reports generated by reporting engine 22.

Exemplary computers 4, 6, 8, and 10 include personal computers, laptops, notebooks, hand held computers, set-top boxes, personal digital assistants, cellular telephones, transponders, and any other device suitable for interaction with server 12 or BIS 16. In an embodiment, BIS 16 may be incorporated into on-line educational system server 12 as an application implemented as computer software modules loaded onto system server 12. Similarly, BIS software modules may also be loaded onto a client computer such as computers 4, 6, 8, or 10. Alternatively, computers 4, 6, 8, or 10 may not require additional software to support BIS 16. For example, a BIS application may be remotely hosted as a stand alone BIS 16 and accessed by any of the computers or servers described herein.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining embodiments of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: course data; content data; institution data; and/or like data useful in the operation of the present invention. As those skilled in the art will appreciate, user computers 4, 6, 8, and 10 include an operating system (e.g., Windows NT, 95/98/2000, OS2, UNIX, Linux, Solaris, MacOS, etc.) as well as various conventional support software and drivers typically associated with computers. User computers may include any suitable personal computer, network computer, workstation, minicomputer, mainframe or the like. User computers 4, 6, 8, and 10 may be in a home, business, or educational institution environment with access to network 14. In an exemplary embodiment, access is through the Internet through a commercially-available web-browser software package.

As used herein, the term "network" 14 shall include any electronic communications means which incorporates both hardware and software components of such. Communication between users or system components in accordance with the present invention may be accomplished through any suitable communication channels, such as, for example, a telephone network, extranet, intranet, Internet, point of interaction device, personal digital assistant (e.g., Palm Pilot®), cellular phone, kiosk, online communications, satellite communications, off-line communications, wireless communications, transponder communications, local area network (LAN), wide area network (WAN), networked or linked devices, keyboard, or any other suitable communication or data input modality.

The invention may be implemented with TCP/IP communications protocols or with IPX, Appletalk, IP-6, NetBIOS, OSI or any number of existing or future protocols. If network 14 is in the nature of a public network, such as the Internet, it may be advantageous to provide firewalls, encryption, or other suitable security measures. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to network 14 via data links, which include, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that network 14 may be implemented as any type of network, such as, for example, an interactive television (ITV) network. Moreover, the system contemplates the use, access, viewing, copying, or distribution of any data, information, goods or services over any network having similar functionality described herein. Additionally, as used herein, "data" may include encompassing information such as commands, queries, files, data for storage, and the like in digital or any other form. The invention contemplates uses in association with web services, utility computing, pervasive and individualized computing, security and identity solutions, autonomic computing, mobility and wireless solutions, open source, biometrics, grid computing and/or mesh computing.

In one embodiment, business data is stored in a central repository comprising a multi-dimensional database 17 within or accessible by BIS 16. Stated otherwise, multiple business data sets are stored together as multi-dimensional data cubes within the database 17. For example, a single data cube may contain data about particular educational content, identification of users who have accessed the content, and the time and duration of the access to the content. Such multi-dimensional data cubes may thus be used to identify trends and best practices as a function of multiple variables or metrics. Data cubes may be used to associate and store any number of discrete data sets. Additionally, discrete data sets may be stored separately within database 17 and associated with other data sets thereafter by various reporting software applications. Multiple data cubes and any number of data sets from multiple cubes may be associated together. For example, data cubes containing usage tracking data from multiple institutions may be aggregated and associated by any relevant criteria to generate aggregate benchmarking data for comparison by individual institutions.

Database 17 may include relational, hierarchical, graphical, or object-oriented structure and/or any other database configurations. Database 17 may be organized, for example, as data tables or lookup tables. Each data record may be a single file, a series of files, a linked series of data fields or any other data structure. In one embodiment, database 17 contains data representing the business history of an institution. In an alternative embodiment, business data may be include data originating from or stored on multiple systems or databases within an institution. Analysis of this historical data supports business decisions at many levels, from strategic planning to performance evaluation of a discrete organizational unit, instructor, content, or student. Data in database 17 may be organized both to process real-time transactions as in online transaction processing systems ("OLTP"), and to support business intelligence analysis.

Business intelligence includes a broad category of applications for gathering, storing, analyzing, and/or providing access to data to inform business decisions. Exemplary applications include features for performing queries and reporting, online analytical processing ("OLAP"), multidimensional online analytical processing ("MOLAP"), statistical analysis, forecasting, and data mining. OLAP technology enables rapid responses to iterative complex analytical queries. MOLAP is OLAP that is indexed directly into a multidimensional database. In general, an OLAP application treats data multi-dimensionally, thereby enabling users to view different aspects or facets of data aggregates such as, for example, sales by time, geography, and product model. If the data is stored in a relational database, it can be viewed multi-dimensionally by successively accessing and processing a table for each dimension or aspect of a data aggregate. In contrast, MOLAP processes data stored in a multi-dimensional array in which all possible combinations of the data are reflected, each in an individual cell that can be accessed directly. For this reason, MOLAP is, for most uses, faster and more user-responsive than OLAP or even than relational online analytical processing ("ROLAP"), the main alternative to MOLAP. There is also hybrid OLAP ("HOLAP"), which combines some features from both ROLAP and MOLAP. Thus, various embodiments may include or support one or more of OLAP, MOLAP, ROLAP, and HOLAP processing.

Data Cubes are the main objects in OLAP providing ready access to data in the data repository. A cube is a set of data that is typically constructed from a subset of data in a data repository and is organized and summarized into a multi-dimensional structure defined by a set of dimensions and measures. A dimension is an organized hierarchy of categories, known as levels, that describes data in data repository fact tables. Dimensions typically describe a similar set of measures upon which the user desires to base an analysis. In a cube, a measure is a set of values based on a column in the cube's fact table. In addition, measures are the central values of a cube or the numeric data of primary interest to users browsing a cube. The measures selected depend on the types of information requested by users, for example, sales, cost, and expenditures.

Association of data, whether manual or automatic, may be accomplished through any data association technique known or practiced in the art. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type or format of data in the key field. The data corresponding to the key field in each of the linked data tables is preferably the same or of the same type. However, data tables having similar, though not identical, data in the key fields may also be linked by using AGREP, for example. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

As stated herein, in various embodiments of the present invention, the data may be stored without regard to a common format. However, in one exemplary embodiment of the present invention, the data set (e.g., BLOB) may be annotated in a standard manner when included for manipulating the data. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer, publisher, or owner of the data. In one example, the first three bytes of each data set BLOB may be configured or configurable to indicate the status of that particular data set; e.g., LOADED, INITIALIZED, READY, BLOCKED, REMOVABLE, or DELETED.

The data set annotation may also be used for other types of status information as well as various other purposes. For example, the data set annotation may include security information establishing access levels for various user roles. The access levels may, for example, be configured to permit only certain users, individuals, levels of employees, institutions, or other entities to access data sets, or to permit access to specific data sets. Furthermore, the security information may restrict or permit only certain actions such as accessing, copying, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the present invention may consist of any combination thereof at a single location or at multiple locations. Additional available security features include firewalls, access codes, encryption, decryption, data compression, and the like. Firewalls may include any hardware and/or software suitably configured to protect system components and/or enterprise computing resources from users of other networks. Further, a firewall may be configured to limit or restrict access to various systems and components behind the firewall for web clients connecting through a web server. Firewalls may reside in varying configurations including Stateful Inspection, Proxy based and Packet Filtering among others. Firewalls may be integrated within a web server or any other system components or may further reside as a separate entity.

The computers discussed herein may include a suitable website or other Internet-based graphical user interface which is accessible by users. Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like.

Computer program instructions may be loaded onto a general purpose computer, special purpose computer, or other programmable data processing apparatus to produce a machine, such that the instructions that execute on the computer or other programmable data processing apparatus create means for implementing the described functions and features. These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus include steps for implementing the functions of the present invention.

Any steps or functions described herein may be implemented by either special purpose hardware-based computer systems that perform the specified functions or steps, or suitable combinations of special purpose hardware and computer instructions. Practitioners will appreciate that the steps described herein may include the use of windows, web pages, web forms, popup windows, prompts and the like. It should be further appreciated that multiple process steps may be combined into single steps, or single steps may be separated into multiple steps for the sake of simplicity.

Figure 2:
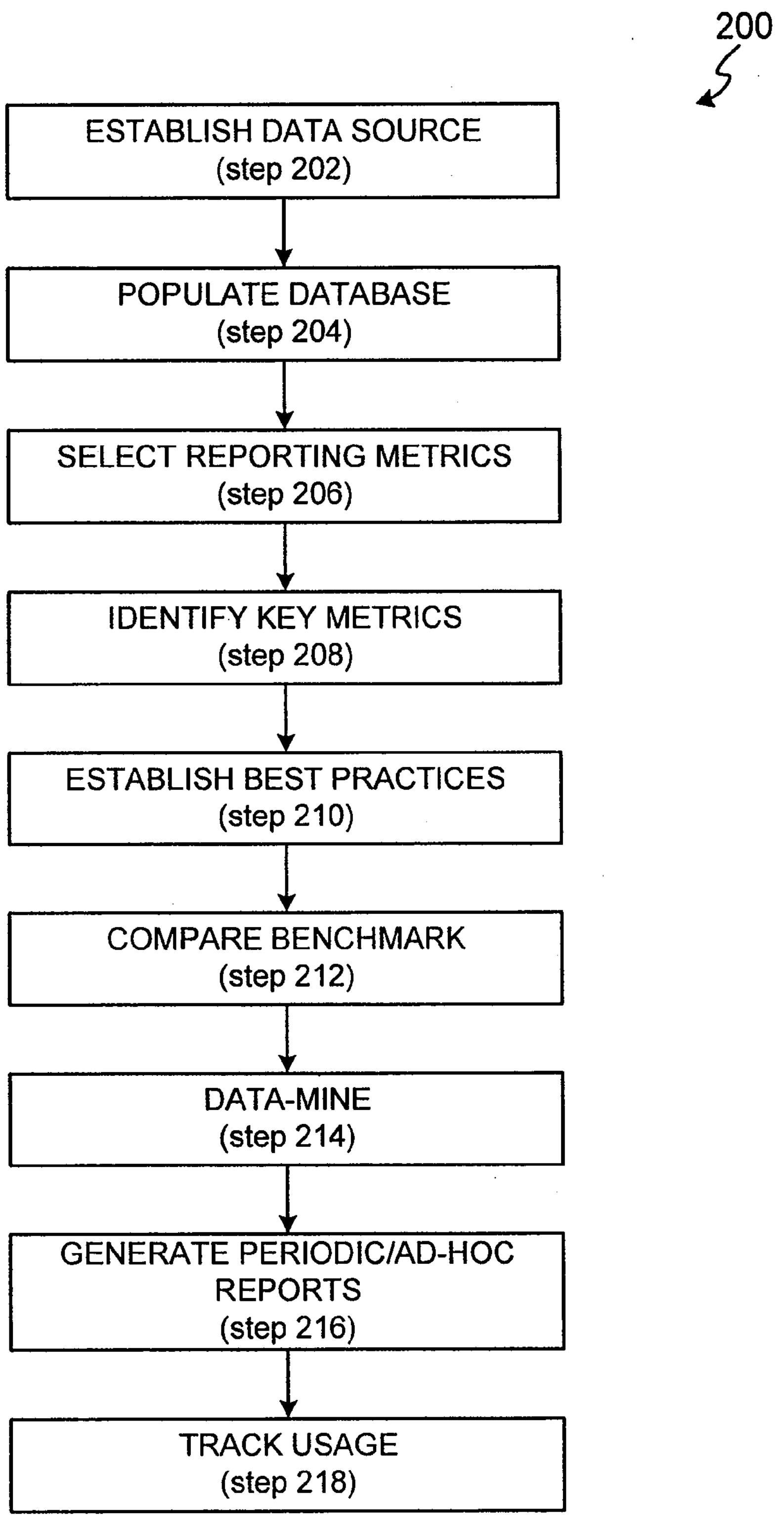
FIG. 2 is a flow chart of steps performed by an exemplary business intelligence system in accordance with an exemplary embodiment of the present invention.

With reference now to FIG. 2, a flow chart of an exemplary BIS workflow 200 is shown in accordance with an exemplary embodiment of the present invention. Individual data sources are established at a central repository for a plurality of institutions offering online educational courses (step 202). Alternatively, various embodiments allow for flexible data deployment, allowing institutions to locally host their data and run reporting engine 22 against the data, or to allocate data storage between a central repository and a local repository. A central repository provides the advantage of access to aggregated data for use by benchmarking engine 20. Authorized users may be granted access to aggregated data across multiple or all institutions at a given level or node within a hierarchy of an institution(s). In accordance with various embodiments, a central data repository and/or data management application provides centralized access to business information and other data for institutions, content publishers, and other online education service providers. While the description of the invention herein may refer to online education service providers, one skilled in the art will appreciate that the invention may be applicable to other providers, industries, organizations, individuals and businesses.

Any number of measures, metrics, or data sets may be established for population in a database from any number of applications (step 204). Various measures or metrics are selected for individual or correlated reporting (step 206). Similarly, all available metrics or various combinations of metrics may be compared against a given data set to identify a degree of correlation or the relative dependency between metrics. For example, by correlating the type and timing of events that historically precede student attrition within a course or program, administrators can identify critical times in the course to communicate with students, especially those who have been identified as "at risk" of dropping the course. Administrators may monitor enrollment, retention, and student activities to identify key events or metrics that correlate with student retention, attrition, performance, and satisfaction (step 208). Key metrics may be similarly identified in association with any business objective by analyzing the correlation between various relevant data sets.

In another example, key metrics on course feature usage, total time spent in a course and/or student/instructor activities are monitored by usage tracking engine 18, enabling administrators to determine and establish "best" student and instructor practices (step 210). For example, instructor performance may be compared based on instructor feature usage, versus student performance across multiple instructors within the same course type or college. This comparison may reveal which types and timing of instructor-student interaction and course tool usage foster student retention, course completion, student performance, and student satisfaction. Best practices may then be standardized, disseminated, and applied throughout an institution.

In various embodiments, benchmarking engine 20 provides benchmarking capabilities whereby administrators may periodically check metrics such as retention, enrollment growth, student satisfaction, for example, by course offerings, and may compare those metrics to anonymous data reported by other campuses, programs, courses, and institutions (step 212) in order to identify targeted areas for improvements. Industry benchmark results may be published or updated periodically by benchmarking engine 20, for example, at the end of every term and at the end of the academic year for various metrics and may be updated real-time for others. Benchmarking may be completely anonymous, or may include some generic information as to size or general location, non-profit versus for-profit, or the like of benchmark institutions. Repository administrators may have access to all associated institution data, while institution administrators may be allowed access only to aggregate or average data for other institutions. Exemplary anonymous data includes the institution size, number of course offerings, and type, whether, for-profit, non-profit, or private, and the like. Aggregate data may represent an average of any sample size, metric, or value derived from multiple metrics.

In another embodiment, a data mining engine allows users to "drill-down" or "drill-through" aggregate data to access the supporting detailed data (step 214). Data mining also enables enhanced data analysis through predictive modeling based on existing data. For example, one data mining engine feature differentiates between enrollment growth and student growth, i.e., between the number of course enrollments and the number of students enrolled, since students can be enrolled in multiple courses. Thus, administrators may monitor growth patterns across multiple terms, nodes, and/or institution(s) in terms of enrollment or student counts for each term. Terms and courses may be measured according to a standard scheduled offering or may be self-paced. The growth patterns can be identified based upon any number or combination of terms, time periods, metrics, or nodes selected.

In various exemplary embodiments, reporting engine 22 provides reporting templates, standard and custom reporting tools, and data analysis tools for retrieving and rendering data from the data repository (step 216). Reporting engine 22 enable users to generate reports of any given number of metrics. Analysis tools enable users to correlate metrics and/or determine trends for or between any number of metrics. Exemplary trends include student enrollment, course enrollment, course completion, student grades, student satisfaction, course evaluations, faculty or administration evaluations and student or faculty time spent within course features. Flexible data analysis tools enable administrators to select any number of relevant metrics or data sets to understand program dynamics and to take appropriate action. Reporting engine 22 may deploy reports from a server hosting institution business data and reporting tools or applications. Reports may be manually generated or may be scheduled to be automatically generated and deployed at fixed periods or following predetermined events. Along with term start and end dates, additional report census dates may be specified, for example, per term as the last day for students to drop a course.

Standard reports or "canned reports" refers to reports that have been pre-designed to address specific question(s), based upon specific data types. Such reports may be generated and deployed by reporting engine 22 from the central repository, or may be generated locally to an institution, accessing central repository data, or a mixture of local and central repository data. The term "custom reports" refers to reports, or queries, that can be designed by a user to address any number of metrics. These may be one-time reports or they may be saved for addition to the list of regularly created reports. Thus, custom reports may be based upon the preferences of any user at any given time, with any available data. Custom reports may be saved and regularly updated and deployed to users.

In an exemplary custom report, an administrator may request a report with any number of individual or correlated metrics, over any period, and further over a term or course. Reported time data may be selectable to display user activity at certain events, for example, the number of hours spent by an instructor during an initial period of a course or the number of hours spent by students within a set period prior to examinations. In one embodiment, reported data is nested, for example, by term, course, feature, user, and time. Data may be recorded and reported in terms of any desired time period, for example, in minutes or hours, or over days or weeks.

Reports may be automatically generated, may be manually generated by institution administrators, and/or BIS administrators may assist institutions with live technical consulting services to create custom reports. Reports may be customizable, for example, both as to the metrics selected for reporting and as to the display of results, e.g., row, column, and axis names, etc. Reports may include graphical views, charts, graphs, or any other suitable data rendering mechanism now known or later developed. Users may customize labels on reports and display results in any number of standard or customized charts. Standard reports may be designed to specifically address predetermined metrics or business questions, or groups of metrics or business questions. Similarly, administrators may more readily provide compliance information and reports to accreditation boards and other regulatory bodies to secure and justify funding.

Various embodiments include a custom query engine that provides users the capability to create custom queries and reports. The query engine allows users to search for, parse, and/or combine data to build reports, modify existing standard reports, select or establish one or multiple dimensions/hierarchies, and to name and save modified reports or custom reports.

Exemplary reports (e.g., standard and/or custom) include one or more of: enrollment (i.e., number of billable users in a course), student number (i.e., named users enrolled in courses), combined enrollment growth and student number growth across multiple terms, student performance (i.e. GPA or learning outcomes), enrollment growth within a given course, course type, node, course type across nodes within an institution, and the like. Additional reports address the percentage of courses offered that are actually run per node, per term, and per institution. To determine actual "run rates" for courses, the report compares the courses offered for a term, (offered at the term start date), with how many of those courses actually had students enrolled at a given census date.

Additional exemplary reports address the average number of enrollments per course, node, term, institution and the enrollment growth and student number growth, for a term type across multiple terms or nodes. Still, additional reports indicate the average number of courses per student, the number of faculty per enrollment and per student, number of administrators per enrollment and per student, course completion and/or retention, course or instructor evaluation, grades per student and/or instructor. Any number of custom evaluations and custom reports may be used to monitor any number of metrics.

In an exemplary standard reporting scenario, an administrator accesses reporting engine 22 to request a report on the overall enrollment and student number growth across multiple terms. In an exemplary freeform or custom query reporting scenario, an administrator accesses a custom query engine and uses freeform queries and drill-down methodology, for example, to identify the relationships, i.e., ratios or percentages, between students, enrollments, retention, attrition, faculty, administrators, and the like. For example, an exemplary custom report may show the ratio of students/enrollments to instructors and student hours to instructor hours identified by term and node.

In one exemplary embodiment, the usage tracking engine 18 includes modules for tracking usage of course or system tools and interaction between students and instructors or other users (step 218). User tracking data may then be correlated with any desired metric, such as student performance relative to established learning objectives. For example, administrators may identify common course usage characteristics for students who do not complete courses. Similarly, administrators may analyze and measure learning outcomes at the course level. The term "learning outcomes" includes, for example, a standard or unit of measure defining the level of understanding or acquisition of defined knowledge or skill sets. In one embodiment, learning outcomes include comprehension of a learning content item, acquisition of a standardized skill, mastery of a standardized learning objective and the like. A more complete description of tracking of learning outcomes is found in U.S. patent application Ser. No. 11/160,487, which is incorporated herein in it entirety.

In one embodiment, usage tracking engine 18 monitors use of features in a course such as threaded discussion, document sharing, gradebook, or journal features. User session data is recorded per minute, user, course, term, node, institution, or in any combination of these or similar data. Thus, administrators, instructors, or other authorized users may audit user tracking data to identify, for example, which features students and instructors use in each course and how much time each spends in each feature in a course. Additionally, administrators may determine the average student and/or instructor time spent within a given course per day, week, term, etc. For example, administrators may track the response time for instructors or help desk personnel to respond to student communications or the time required for an instructor to grade student submissions within a particular feature.

Additional usage tracking data includes how, where, and when a student registered, whether online, in person, or by mail and whether a student was directly admitted or was wait-listed. Similar data or reports may correlate student demographic information with any relevant metric. For example, users may generate a custom report correlating enrollment with student demographics to determine where to direct an advertising campaign. In an exemplary usage tracking scenario, the tracking tool records data in the central repository indicating the frequency of access to a given feature, tool, report, or function, the duration of user access, and the identity of the user. Any of the reporting or tracking tools described herein may include charting, graphing or similar capabilities in order to support different views and interpretations of data.

Reports and queries may be exported into an Excel spreadsheet, export file, or to a peripheral device such as a printer or fax server. Reports may include any number of spreadsheet capabilities such as data sorting and mathematical functions to obtain an average, total, minimum, or maximum value and the like. Similarly, data filter capabilities my enable users to narrow a search or select a subset of displayed data. Users may sort data columns, rename columns/rows, select graphical displays, and export data.

Figure 3:
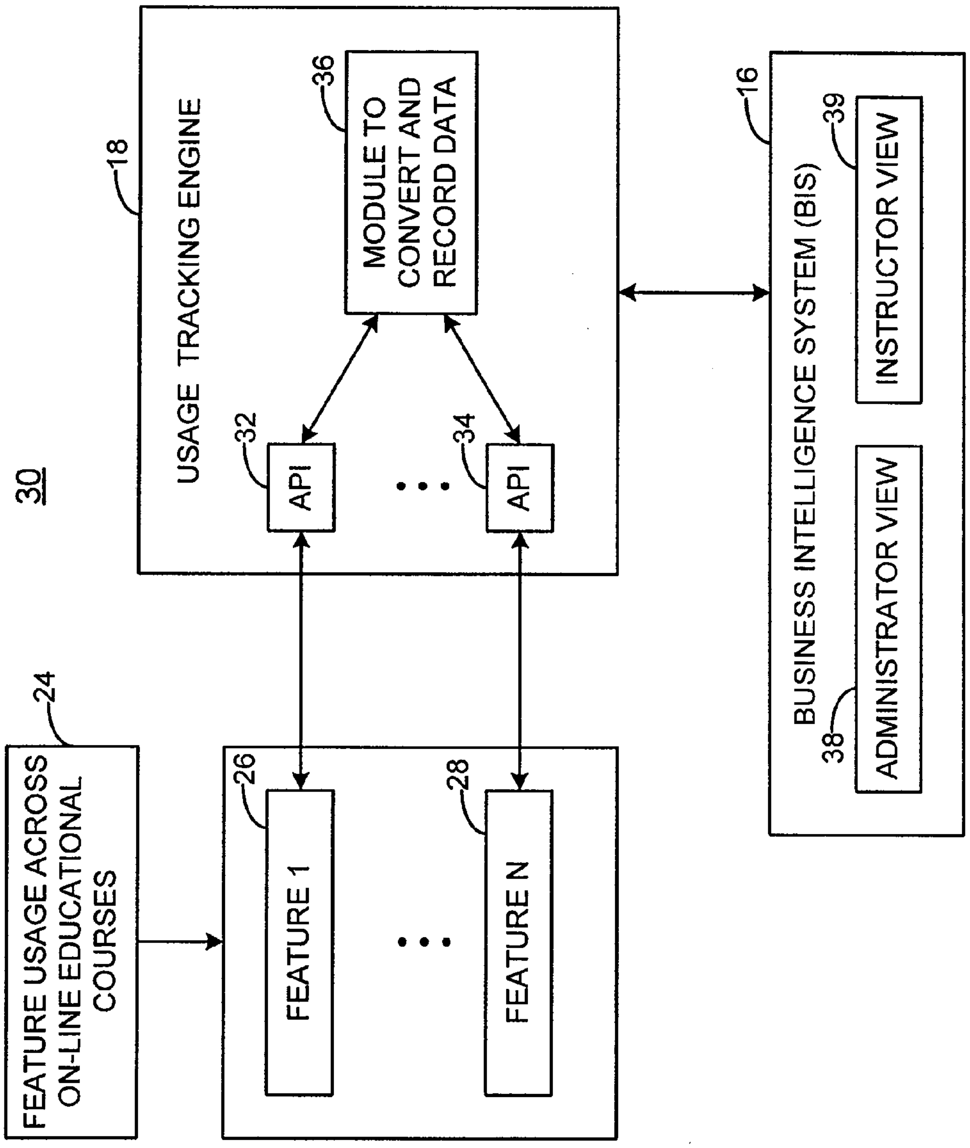
FIG. 3 is a diagram illustrating an exemplary usage tracking engine in accordance with an exemplary embodiment of the present invention.

FIG. 3 illustrates an exemplary BIS usage reporting configuration 30 for compiling system usage data from disparate system features, tools, applications, and functions. During participation in on-line educational courses, students and instructors access various features 26 and 28 within disparate systems and applications, generating data for feature usage 24. Features 26 and 28 include a variety of course tools, content delivery mechanisms, administrative tools, and the like. Exemplary course tools and content delivery mechanisms include, for example, a lecture, an exam, document sharing, student journal, student portfolio, and chat dialogue. Document sharing tools allow content to be posted, uploaded and accessed or downloaded by multiple users. Additional system features include a help desk, whether live or online and tracking of help desk access. For example, a notice may be generated to an administrator upon detecting that a student has accessed a help desk more than twice in the first week of a course. Accordingly, administrators may proactively reach out to students who are requesting types of help that have been historically associated student attrition. Alternatively, only certain types of help desk inquiries may be associated with student attrition. Similarly, help desk data may be used to identify courses for which content is missing or unavailable. In an exemplary usage tracking report, the number of hours spent by a professor within a content development application may be recorded and reported to administrators to track the progress of course preparation. Usage may be tracked and reported by term, course, feature, user and the like. Thus, usage tracking may be used to identify and track any number of events, issues, and metrics.

Usage tracking engine 18, in one embodiment, tracks user activity by the minute according to the course tool, or system feature accessed or by any other relevant criteria, or metric. Usage tracking engine 18 may cooperate with or be integral with BIS 16. An exemplary usage tracking engine 18 includes application programming interfaces (APIs) 32 and 34 or any other type of hardware or software element suitable to monitor feature usage 24 for features 26 and 28. Usage tracking engine 18 includes a module(s) 36 for suitably receiving, converting and/or compiling information from APIs 32 and 34 for use by BIS 16. In this example, BIS 16 includes an administrator interface view 38 and an instructor interface view 39. Authorized users may access BIS tools and features from within an associated application or within any suitable administrative BIS interface. An example of an on-line education system, including content delivery mechanisms and course tools, is included in U.S. Pat. No. 6,470,171, which is incorporated herein by reference.

In an exemplary embodiment, administrator interface view 38 and instructor interface view 39 include "book" views that comprise groups of dynamic reports based on real-time or frequently updated data. Alternatively, static views may be periodically generated based on historical data. Additional reporting tools facilitate regression and correlation analysis. Users may select any desired time period for a given report and may view a given report along a full timeline available for a selected metric. Users may establish goals or target metric values to be included in a report, to better observe changes in trends with respect to established goals. For example, an administrative user may establish target values and easily monitor trends and the target status for any number of course related metrics, such as, for example, course completion, average instructor time per day, average student time per day, student to instructor ratios, program retention, and student satisfaction. Any number or type of visual indicators may be used to show trends or compliance of selected metrics relative to established target values.

Another exemplary administrator interface view 38 includes a key metrics view listing multiple selected metrics as well as corresponding target metric values, actual metric values, status indicators, and trend indicators. Views 38 and 39 may include lists of scheduled reports, archived reports, custom or custom reports, benchmark reports, notices, and the like. Accordingly, an administrator or instructor may readily assess a given metric and quickly assess a group of metrics and associated trends.

Yet another exemplary view 38 or 39 includes a dynamic table showing various courses in a selected term, course start and completion dates, aggregate user activity hours per course tool (e.g., document sharing, threaded discussion, etc), and ending enrollment per course. Users may select any number of metrics for comparison by course, term, user, or the like to determine the metrics and factors that affect student retention, performance, and satisfaction. Since students may enroll in online classes at more than one institution or through more than one campus, centralized data storage allows for more complete data analysis across these institutions and campuses.

Figure 4:
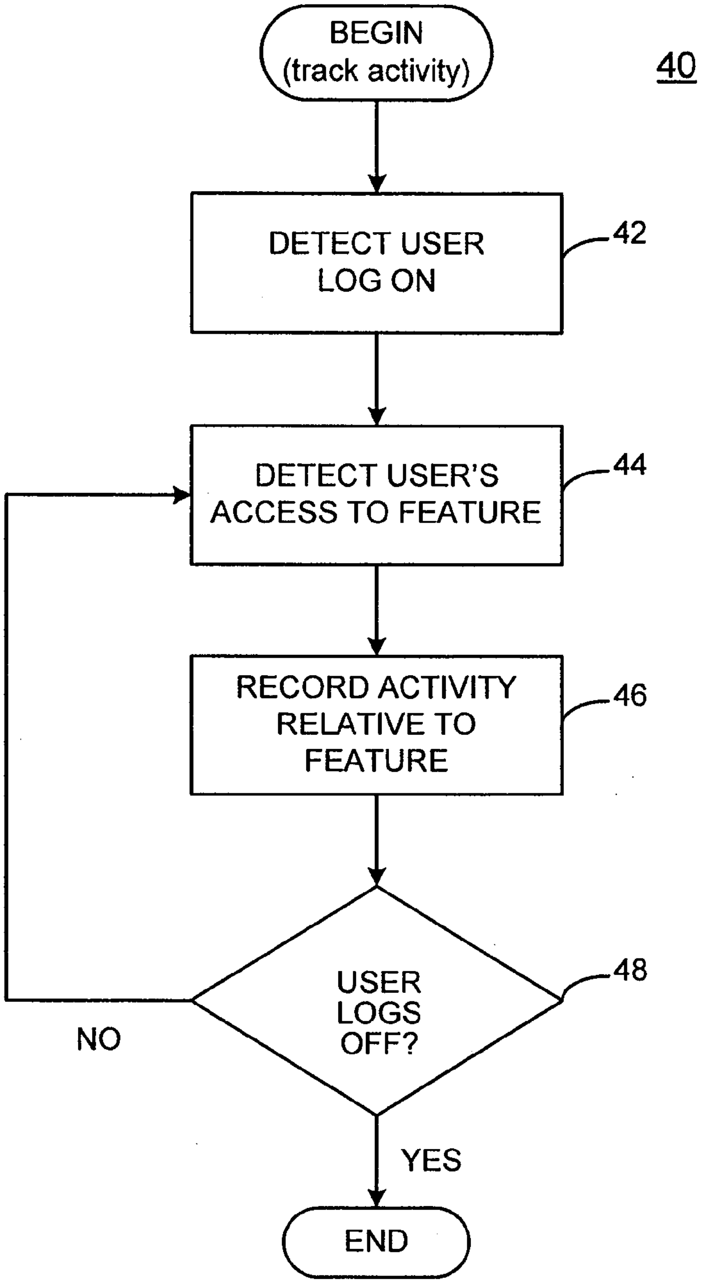
FIG. 4 is a flow chart of an exemplary usage tracking routine in accordance with an exemplary embodiment of the present invention.

FIG. 4 is a flow chart of an exemplary user activity tracking routine 40. Routine 40 may be implemented as software modules, for example, for execution by BIS 16 or system server 12. In routine 40, usage tracking engine 18 detects and logs a user log on (step 42). A user may access or log onto system server 12 or other remote server providing on-line educational system features or courses. Usage tracking engine 18 further detects the user's access to particular system features or course tools (step 44). Usage tracking engine 18 records activity data relative to the user and features accessed (step 46). Usage tracking engine 18 continues to record student activity until the student logs off (step 48). Routine 40 may be executed simultaneously for multiple students across different courses.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention.

What is claimed is:

1. A data management system comprising:

a host server including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor;

a database for storage of multi-dimensional data;

a usage tracking engine configured to generate multi-dimensional tracking data including at least two of identification of a feature accessed by a user, identification of content accessed by a user, an identification of a user accessing said feature, a time of access to said feature, a duration of access to said feature, or user activity relative to said feature, wherein said user is at least one of a student or an instructor;

a reporting engine configured to provide periodic reports based on said multi-dimensional data stored in said database;

a predictive model configured to understand program performance, student retention, and learning outcomes; and, a multi-dimensional analysis engine configured to understand program performance, student retention, learning outcomes.

2. The system of claim 1, wherein said usage tracking engine is configured to facilitate comparison of at least one of student usage profiles, instructor usage profiles, faculty usage profiles, administration usage profiles, or course tool usage profiles.

3. The system of claim 1, wherein said usage tracking engine is configured to facilitate comparison of usage profiles grouped according to at least one of user role type, feature type, term, course, or hierarchal node.

4. The system of claim 1, further comprising a custom query engine configured to facilitate freeform searches of said multi-dimensional data in said database.

5. The system of claim 1, wherein said reporting engine is configured to facilitate reporting of at least one of course retention rates, course evaluations, faculty evaluations, enrollment, student performance, faculty response times, help desk response times, and course run rates.

6. The system of claim 1, wherein said benchmarking engine is configured to facilitate comparison of said internal data with said aggregate data related to at least one of student retention, student enrollment, course completion, student satisfaction, student to faculty ratios, learning outcomes, and student performance.

7. The system of claim 1, wherein said aggregate data is grouped according to at least one of the size of said educational institution and whether said educational institution is at least one of a for-profit, non-profit and private institutions.

8. The system of claim 1, wherein at least one of said usage tracking engine, said benchmarking engine, and said reporting engine is configured to facilitate determination of best practices relating to at least one of student enrollment, student retention, course completion, student performance, learning outcomes, and student satisfaction.

9. The system of claim 1, wherein said reporting engine is configured to provide notification of potential user attrition based upon a comparison of a user profile in said database with historic user profile data.

10. The system of claim 1, further comprising a data mining engine configured to provide access to detailed data supporting said periodic reports.

11. The system of claim 1, further comprising an interface view listing a reported metric value and a corresponding target metric value and at least one of a status indicator or a trend indicator dependent on said reported metric value and said target metric value.

12. The system of claim 1, wherein said usage tracking engine is configured to record data related to a user's access to a help desk feature, including the nature of a query submitted to said help desk feature.

13. The system of claim 1, wherein said reporting engine is configured to report a method of student registration and demographic information for said student.

14. The system of claim 1, wherein said multidimensional data is from multiple online educational institutions.

15. The system of claim 1, further comprising a benchmarking engine configured to aggregate said multi-dimensional data to facilitate comparison of internal data associated with a first educational institution with aggregate data from a subset of multiple educational institutions.

16. A method for managing educational data at a central repository comprising:

tracking, by a host server, student activity associated with a feature of an application accessed by said student, wherein said host server includes a processor for processing digital data, a memory coupled to said processor for storing digital data, an input digitizer coupled to said processor for inputting digital data, an application program stored in said memory and accessible by said processor for directing processing of digital data by said processor, a display coupled to said processor and memory for displaying information derived from digital data processed by said processor and said central repository;

tracking, by said host server, student activity associated with content accessed by said student;

generating, by said host server, a student profile within a central repository from said student tracking;

recording, by said host server, at least one of a time and a duration of said student activity within said student profile;

tracking, by said host server, instructor activity associated with a feature of an application accessed by said instructor;

tracking, by said host server, instructor activity associated with content accessed by said instructor;

generating, by said host server, an instructor profile within a central repository from said instructor tracking;

recording, by said host server, at least one of a time and a duration of said instructor activity within said instructor profile;

comparing, by said host server, internal data associated with a first program level to said internal data associated with a second program level;

correlating academic activities within said student profile and said instructor profile;

using predictive models, by said host server, to facilitate predictions related to academic program performance, student retention, and learning outcomes;

performing an analysis to understand at least one of academic program performance, faculty effectiveness, student retention, and learning outcomes;

identifying key drivers, trends and problems related to student course completion and successful course learning outcomes by analyzing said student profile and said instructor profile;

determining strategies for academic program growth based upon said multi-dimensional analysis, said key drivers, said trends and said problems;

identifying trends related to attrition in an academic program;

identifying times of activities that precede said attrition in said academic program;

providing, by said host server, periodic reports based on said identifications, strategies and said business data stored in said database, wherein said business data includes at least one of student enrollment, registration, student retention, student-instructor interaction, student or instructor system feature usage, student performance, student satisfaction, course evaluations; and, communicating with said student at said time to minimize said attrition.

17. The method of claim 16, wherein said tracking of user activity is performed upon said user accessing at least one of a lecture, exam, document sharing feature, journal feature, student portfolio, chat dialogue, and threaded discussion feature.

18. The method of claim 16, wherein performing an analysis uses at least one of online analytical processing (OLAP), multi-dimensional online analytical processing (MOLAP), relational online analytical processing (ROLAP) and hybrid online analytical processing (HOLAP).

19. A machine-readable medium having stored thereon a plurality of instructions, said plurality of instructions when executed by a host server for managing educational data at a central repository, cause said host server to perform operations comprising:

tracking, by said host server, student activity associated with a feature of an application accessed by said student, wherein said host server includes a processor for processing digital data, a memory coupled to said processor for storing digital data, an input digitizer coupled to said processor for inputting digital data, an application program stored in said memory and accessible by said processor for directing processing of digital data by said processor, a display coupled to said processor and memory for displaying information derived from digital data processed by said processor and said central repository;

tracking, by said host server, student activity associated with content accessed by said student;

generating, by said host server, a student profile within a central repository from said student tracking;

recording, by said host server, at least one of a time and a duration of said student activity within said student profile;

tracking, by said host server, instructor activity associated with a feature of an application accessed by said instructor;

tracking, by said host server, instructor activity associated with content accessed by said instructor;

generating, by said host server, an instructor profile within a central repository from said instructor tracking;

recording, by said host server, at least one of a time and a duration of said instructor activity within said instructor profile;

comparing, by said host server, internal data associated with a first program level to said internal data associated with a second program level;

correlating academic activities within said student profile and said instructor profile;

using predictive models, by said host server, to facilitate predictions related to academic program performance, student retention, and learning outcomes;

performing an analysis to understand at least one of academic program performance, faculty effectiveness, student retention, and learning outcomes;

identifying key drivers, trends and problems related to student course completion and successful course learning outcomes by analyzing said student profile and said instructor profile;

determining strategies for academic program growth based upon said multi-dimensional analysis, said key drivers, said trends and said problems;

identifying trends related to attrition in an academic program;

identifying times of activities that precede said attrition in said academic program;

providing, by said host server, periodic reports based on said identifications, strategies and said business data stored in said database, wherein said business data includes at least one of student enrollment, registration, student retention, student-instructor interaction, student or instructor system feature usage, student performance, student satisfaction, course evaluations; and, communicating with said student at said time to minimize said attrition.

* * * * *

UNITED STATES PATENT AND TRADEMARK OFFICE

CERTIFICATE OF CORRECTION

PATENT NO. : 7,937,416 B2
APPLICATION NO. : 12/189025
DATED : May 3, 2011
INVENTOR(S) : Cassandra Hossfeld et al.

It is certified that error appears in the above-identified patent and that said Letters Patent is hereby corrected as shown below:

In Column 14 line 33, please delete “the” and insert therefor --said--.

In Column 15 line 4, please delete “wherein said” and insert therefor --further comprising a--.

In Column 15 line 5, please delete “is”.

In Column 15 line 5, please delete “said”.

In Column 15 line 15, please delete “said” and insert therefor --a--.

In Column 16 line 21, please delete “and” and insert therefor --or--.

In Column 16 line 41, after student satisfaction, insert therefor --or--.

In Column 16 line 47, please delete “and” and insert therefor --or--.

In Column 16 line 52, please delete “and” and insert therefor --or--.

In Column 18 line 3, please delete “and” and insert therefor --or--.

Signed and Sealed this
Thirty-first Day of July, 2012

David J. Kappos

David J. Kappos
*Director of the United States Patent and Trademark Office*